(12) United States Patent
Deguillard et al.

(10) Patent No.: US 10,445,123 B2
(45) Date of Patent: Oct. 15, 2019

(54) HYPERVISOR EXCHANGE WITH VIRTUAL-MACHINE CONSOLIDATION

(71) Applicants: Xavier Deguillard, Mountain View, CA (US); Mukund Gunti, Sunnyvale, CA (US); Adrian Drzewiecki, Mountain View, CA (US); Rajesh Venkatasubramanian, San Jose, CA (US)

(72) Inventors: Xavier Deguillard, Mountain View, CA (US); Mukund Gunti, Sunnyvale, CA (US); Adrian Drzewiecki, Mountain View, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 87 days.

(21) Appl. No.: 15/189,108

(22) Filed: Jun. 22, 2016

(65) Prior Publication Data

US 2016/0306648 A1    Oct. 20, 2016

Related U.S. Application Data

(63) Continuation-in-part of application No. 14/642,656, filed on Mar. 9, 2015.

(Continued)

(51) Int. Cl.
*G06F 3/06* (2006.01)
*G06F 8/656* (2018.01)
(Continued)

(52) U.S. Cl.
CPC .......... *G06F 9/45558* (2013.01); *G06F 3/061* (2013.01); *G06F 3/0607* (2013.01);
(Continued)

(58) Field of Classification Search
CPC .. G06F 7/78; G06F 8/00–78; G06F 9/44–455; G06F 11/36; G06F 9/505; G06F 8/65
(Continued)

(56) References Cited

U.S. PATENT DOCUMENTS 6,961,941 B1    11/2005   Nelson et al.
7,814,495 B1 *  10/2010   Lim ..................... G06F 9/45558
                                                              717/168
(Continued)

FOREIGN PATENT DOCUMENTS

WO    WO 2014/149583    9/2014

OTHER PUBLICATIONS

Alford, "AIX 6.1 Workload Partitions, Basic management of Workload Partitions in AIX", IBM developerWorks, Nov. 20, 2007, downloaded from https://www.ibm.com/developerworks/aix/library/au-workload/.

(Continued)

*Primary Examiner* — Phillip H Nguyen

(57) ABSTRACT

A hypervisor exchange, e.g., an upgrade, can include consolidating resident virtual machines into a single host virtual machine, exchanging an old hypervisor with a new (upgraded) hypervisor, and disassociating the virtual resident virtual machines by migrating them to the new hypervisor. The consolidating can involve migrating the resident virtual machines from the old hypervisor to a guest hypervisor on the host virtual machine. The exchange can involve: 1) suspending the host virtual machine before the exchange; and 2) resuming the host virtual machine after the exchange; or migrating the host virtual machine from a partition including the old hypervisor to a partition hosting the new hypervisor. Either way, an exchange (upgrade) is achieve without requiring a bandwidth consuming migration over a network to a standby machine.

15 Claims, 4 Drawing Sheets

Related U.S. Application Data

(60) Provisional application No. 62/105,128, filed on Jan. 19, 2015.

(51) Int. Cl.
  *G06F 9/455* (2018.01)
  *G06F 9/4401* (2018.01)

(52) U.S. Cl.
  CPC .......... *G06F 3/0644* (2013.01); *G06F 3/0647* (2013.01); *G06F 3/0664* (2013.01); *G06F 3/0673* (2013.01); *G06F 8/656* (2018.02); *G06F 9/4406* (2013.01); *G06F 2009/4557* (2013.01); *G06F 2009/45575* (2013.01)

(58) Field of Classification Search
  USPC .......................................... 718/105; 717/168
  See application file for complete search history.

(56) References Cited

U.S. PATENT DOCUMENTS

| | | | |
|---|---|---|---|
| 7,818,726 B2 | 10/2010 | Apparvoo et al. | |
| 8,181,007 B2 | 5/2012 | Liu | |
| 9,396,016 B1* | 7/2016 | Marquardt | G06F 9/45558 |
| 2005/0071811 A1 | 3/2005 | Appavoo et al. | |
| 2006/0242442 A1 | 10/2006 | Armstrong et al. | |
| 2006/0294337 A1 | 12/2006 | Hartung et al. | |
| 2008/0184373 A1 | 7/2008 | Traut et al. | |
| 2008/0320194 A1 | 12/2008 | Vega et al. | |
| 2009/0288087 A1 | 11/2009 | Ringseth et al. | |
| 2010/0125845 A1 | 5/2010 | Sugumar et al. | |
| 2011/0119670 A1* | 5/2011 | Sugumar | G06F 9/5088 718/1 |
| 2011/0153872 A1 | 6/2011 | Nath | |
| 2012/0011520 A1 | 1/2012 | Filali-Adib et al. | |
| 2012/0017029 A1 | 1/2012 | Santos et al. | |
| 2012/0017031 A1 | 1/2012 | Mashtizadeh et al. | |
| 2012/0054486 A1* | 3/2012 | Lakkavalli | G06F 21/57 713/156 |
| 2012/0216187 A1* | 8/2012 | Ben-Yehuda | G06F 9/45558 718/1 |
| 2012/0254860 A1* | 10/2012 | Bozek | G06F 9/461 718/1 |
| 2012/0291021 A1* | 11/2012 | Banerjee | G06F 8/665 717/173 |
| 2013/0232486 A1* | 9/2013 | Chen | G06F 9/455 718/1 |
| 2013/0263118 A1* | 10/2013 | Kannan | G06F 9/45558 718/1 |
| 2014/0019968 A1* | 1/2014 | Deng | G06F 9/45558 718/1 |
| 2014/0149635 A1* | 5/2014 | Bacher | G06F 9/45558 711/6 |
| 2014/0229943 A1* | 8/2014 | Tian | G06F 9/45558 718/1 |
| 2014/0282539 A1* | 9/2014 | Sonnek | G06F 9/45558 718/1 |
| 2015/0169329 A1 | 6/2015 | Barrat et al. | |
| 2015/0212844 A1* | 7/2015 | Tsirkin | G06F 9/45558 718/1 |
| 2015/0324227 A1 | 11/2015 | Sizemore | |
| 2015/0331692 A1 | 11/2015 | Schekochikhin et al. | |
| 2016/0026489 A1 | 1/2016 | Maislos et al. | |
| 2016/0092678 A1 | 3/2016 | Probert et al. | |
| 2016/0139946 A1* | 5/2016 | Gardner | G06F 9/45558 718/1 |
| 2016/0277308 A1* | 9/2016 | Challa | H04L 67/42 |
| 2016/0277309 A1* | 9/2016 | Challa | H04L 47/78 |
| 2016/0277311 A1* | 9/2016 | Challa | G06F 9/5077 |

OTHER PUBLICATIONS

Ball, "What's the difference between a Virtual Machine and a Container?", InfoSec Musings, Apr. 27, 2015, downloaded from http://security-musings.blogspot.com/2015/04/whats-difference-between-virtual.html.

Brasser, et al., "Swap and Play Live Updating Hypervisors and Its Application to Xen", 2014.

Chen, et al., "Live Updating Operating Systems using Virtualization", 2006.

Griffiths, "The LPAR term is dead—Long live the Virtual Server/Machine", AIXpert Blog, Apr. 27, 2011, downloaded from: https://www.ibm.com/developerworks/community/blogs/aixpert/entry/the_lpar_term_is_dead_long_live_the_virtual_server_machine42?lang=en.

IBM, "Mainframe hardware:Logical partitions (LPARs)", IBM Knowledge Center, 2010, p. 30, USA, downloaded from https://www.ibm.com/support/knowledgecenter/zosbasics/com.ibm.zos.zmainframe/zconc_mfhwlpar.htm.

Lambert, "What-s the difference between an LPAR and a Virtual Machine?", Quora, Apr. 5, 2016, downloaded from https://www.quora.com/Whats-the-difference-between-an-LPAR-and-a-Virtual-Machine.

* cited by examiner

HYPERVISOR EXCHANGE WITH VIRTUAL-MACHINE CONSOLIDATION

This application is a continuation-in-part (CIP) of copending U.S. patent application Ser. No. 14/642,656 filed 2015 Mar. 11 and claims the benefit of its filing date. This application also claims the filing date of U.S. Provisional Patent Application 62/105,128, filed 2015 Jan. 19, of which this CIP's parent application is a non-provisional.

Upgrading a hypervisor can involve shutting down the virtual-machines hosted by the hypervisor. Depending on the mission(s) to which the virtual machines have been dedicated, the shutdown may be costly or otherwise unacceptable. To avoid the shutdown, the virtual machines can be migrated to a standby machine, e.g., using a product such as vMotion, available from VMware, Inc. For example, when upgrading the ESX, a hypervisor available from VMware, Inc., the host is put in a maintenance mode that migrates all the virtual machines from the host machine to a standby machine. While the virtual machines execute on the standby machine, the original host machine can be provided with an updated hypervisor. The virtual machines can be migrated back, completing the upgrade. Of course, if the standby machine has an instance of the updated hypervisor, the return migration may be omitted.

Relying on migration to a standby machine to avoid shutting down virtual machines can be problematic. First of all, the required standby machine may not be available. Also, if the number of virtual machines is great and/or if their average size is large, each migration may consume considerable network bandwidth for an extended duration, depriving other network nodes of the bandwidth they may need. For example, a large virtual-machine system can include more than 100 gigabytes (GB) that must be migrated. Accordingly, there remains a need for a less burdensome approach to upgrading (or otherwise updating or exchanging) a hypervisor.

DETAILED DESCRIPTION

In accordance with the present invention, hypervisors are exchanged without removing or shutting down virtual machines. For example, an upgraded version of a hypervisor can replace a previous version of the hypervisor. To simplify the exchange, the virtual machines are "consolidated" to reduce the number of virtual machines running on the old hypervisor as the exchange begins.

Figure 1:
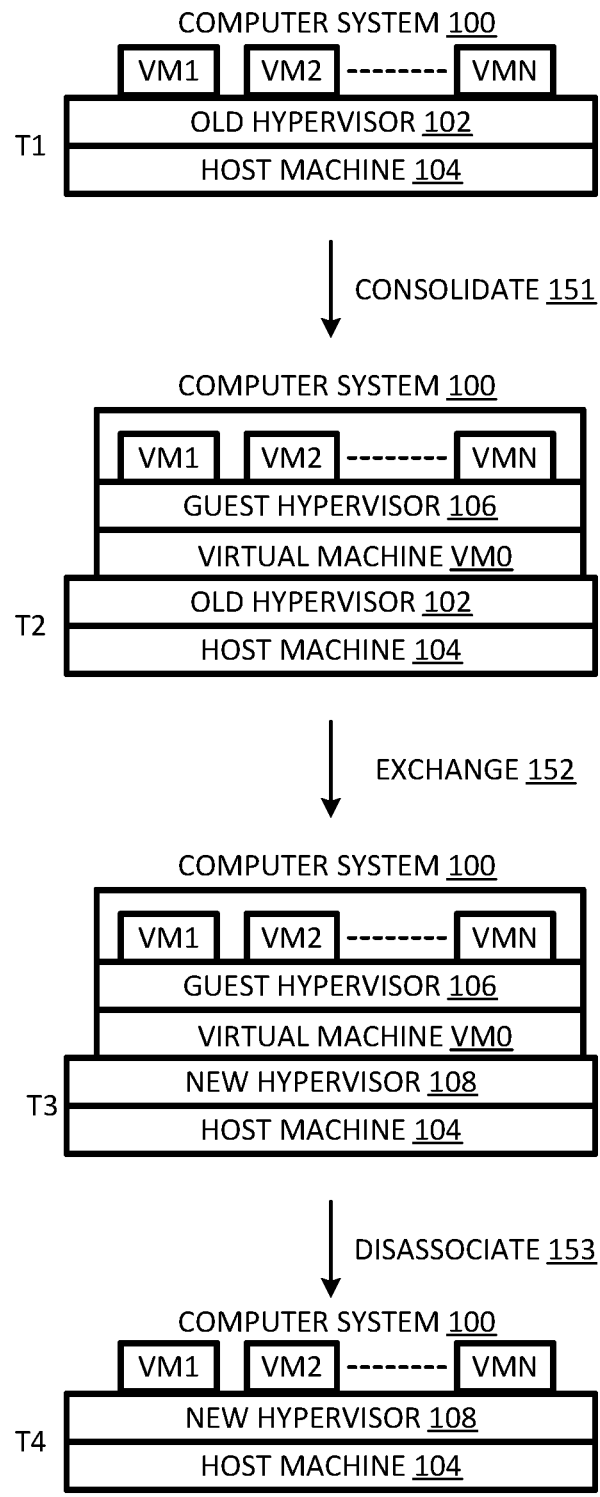
FIG. 1 is a state sequence chart for a same-machine hypervisor exchange including virtual machine consolidation.

For example, in the chart of FIG. 1, at time T1, a computer system 100 includes a number N of "resident" virtual machines, VM1, VM2 . . . VMN running on an "old" hypervisor 102, which itself executes on a host machine 104. During consolidation 151, a host virtual machine VM0, shown in FIG. 1 at time T2, is initiated on old hypervisor 102. The guest operating-system for virtual machine VM0 is a "guest" hypervisor 106. Virtual machines VM1-VMN are migrated from old hypervisor 102 to guest hypervisor 106. From the perspective of old hypervisor 102, there is only one virtual machine (VM0) at time T2.

Thus, during a hypervisor exchange from old hypervisor 102 to new hypervisor 108 there is, in effect, only one virtual machine (VM0) to "worry about". The importance of this is explained further below in the context of the various ways of effecting exchange 152. In any event, as a result of exchange 152, computer system 100 assumes the configuration associated with time T3 in FIG. 1 in which new hypervisor 108 has replaced old hypervisor 102.

At 153, virtual machines VM1-VMN are "dissociated" in that they are no longer presented to a hypervisor as a single virtual machine. The dissociation is accomplished by migrating the virtual machines from guest hypervisor 106 to new hypervisor 108. Virtual machine VM0 is then terminated. The result is shown in FIG. 1 for time T4. Comparing system 100 at time T1 and time T4 shows that old hypervisor 102 has been replaced by new hypervisor 108. In the case that new hypervisor 108 is an upgrade of old hypervisor 102, a hypervisor upgrade is achieved without shutting down the hosted VMs or migrating them to a different host machine.

Figure 2:
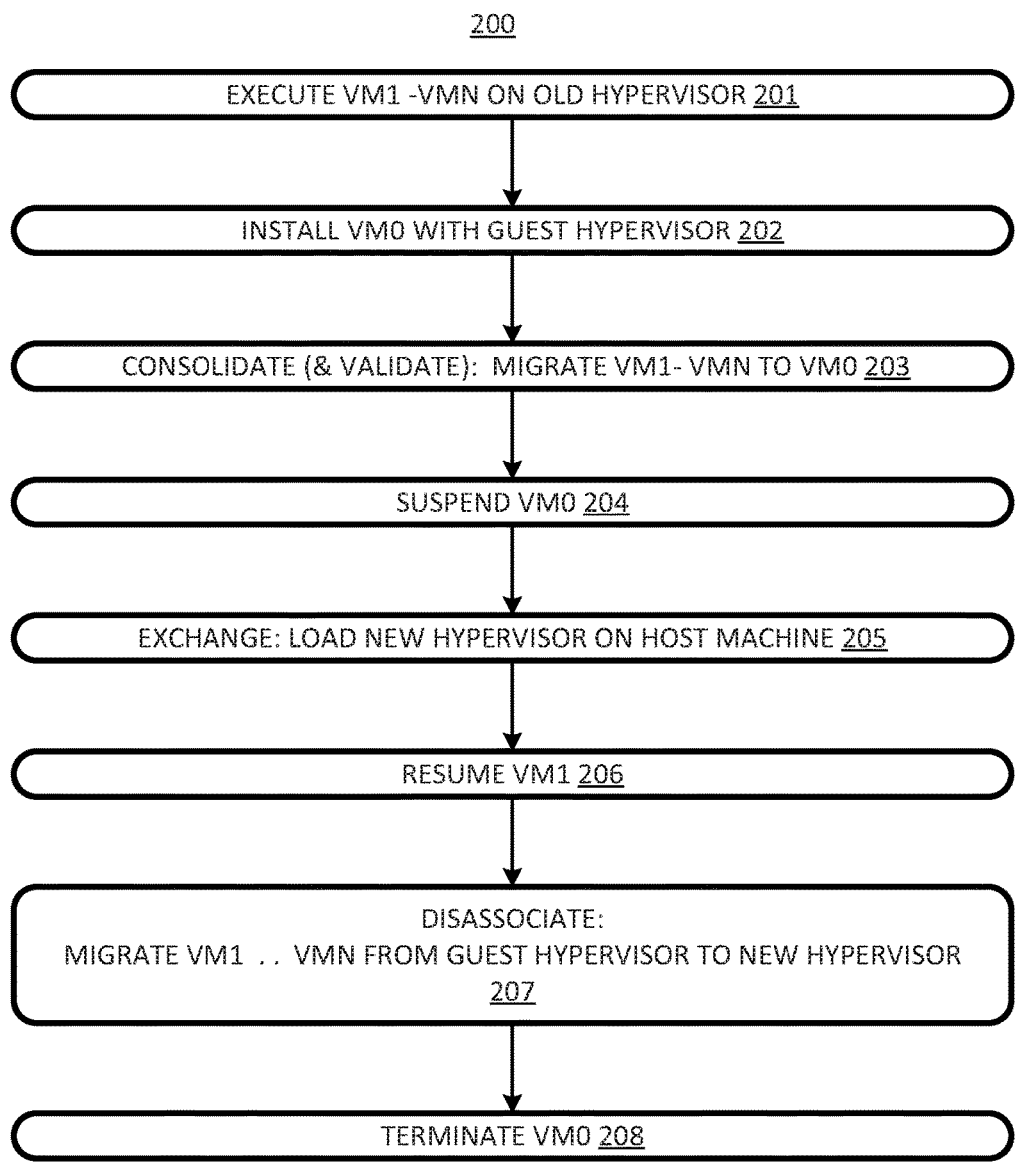
FIG. 2 is a flow chart of a same-machine upgrade process including virtual-machine consolidation and using suspending and resumption of a host virtual machine.

A hypervisor exchange process 200 is flow-charted in FIG. 2. At 201, virtual machines VM1-VMN are executing on an old hypervisor, which is executing on a machine. At 202, a virtual machine is installed with a "guest" hypervisor as its guest operating system. At 203, virtual machines VM1 . . . VMN are migrated from the old hypervisor to the guest hypervisor, implementing consolidation 151 of FIG. 1. If the guest hypervisor is the same as the new hypervisor, the guest hypervisor can be used to validate that VM1-VMN and any partner software will run well together. Alternatively, the guest hypervisor may be the same as the old hypervisor or may be another hypervisor.

At 204, FIG. 2, virtual machine VM0 is suspended, freezing all processes running thereon including processes associated with virtual machines VM1 . . . VMN. At 205, the new hypervisor is loaded onto the machine, terminating the old hypervisor; this implements exchange 152 of FIG. 1. In the case that the hypervisors are versions of VMware's ESX, action 205 uses a technique called loadESX to side-load the new hypervisor on the machine. At 206, FIG. 2, nesting virtual machine VM0 is resumed so that virtual machines VM1 . . . VMN are also resumed.

At 207, virtual machines VM1-VMN are migrated from the guest hypervisor to the new hypervisor, effecting dissociation 153 of FIG. 1. At 208, FIG. 2, virtual machine VM0 can be terminated, completing the hypervisor exchange. In the event that the new hypervisor is an upgraded version of the old hypervisor, process 200 can be seen as a same-machine rebootless hypervisor upgrade process.

Figure 3:
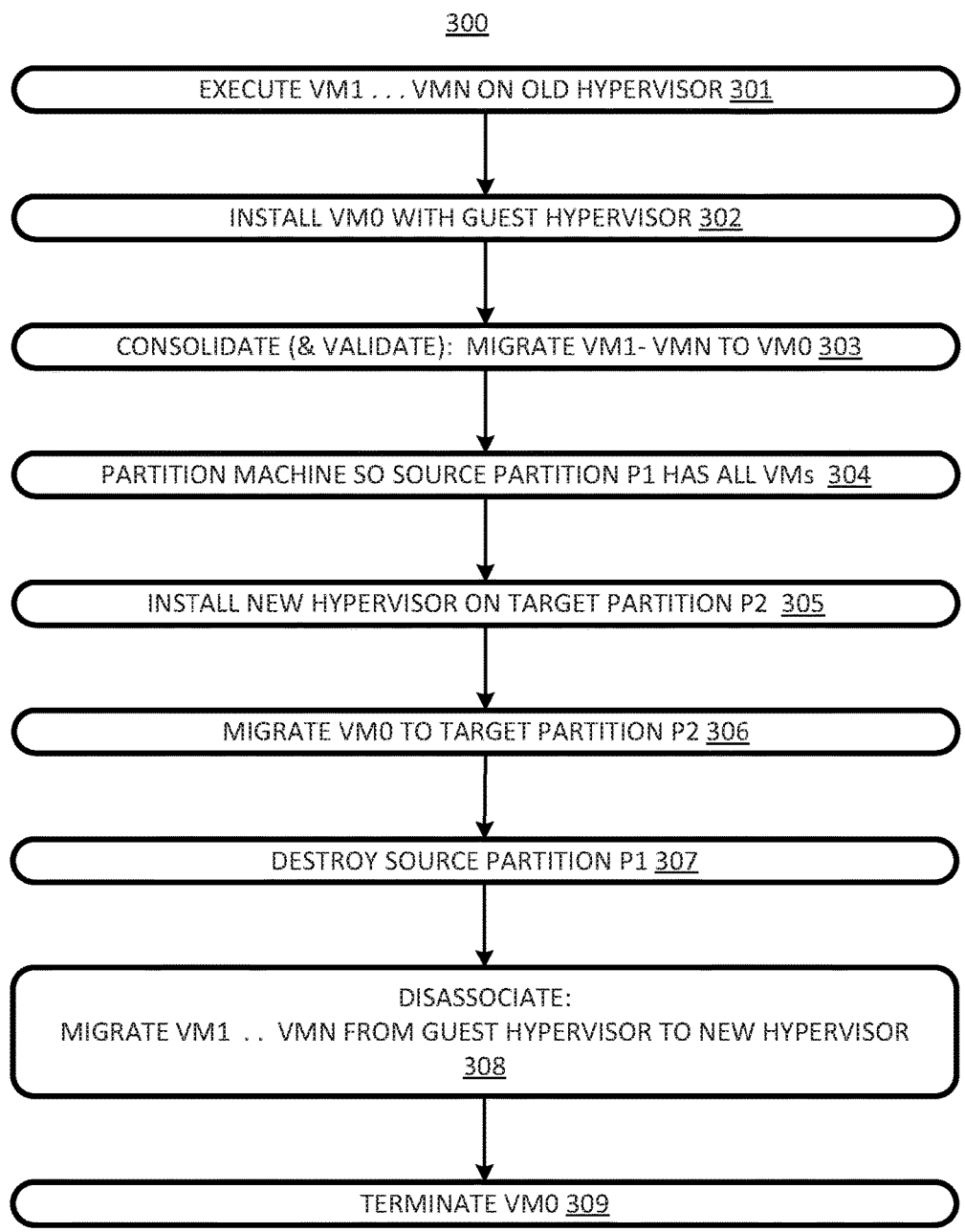
FIG. 3 is a flow chart of a same-machine upgrade process including virtual-machine consolidation and using inter-partition migration of a host virtual machine.

An alternative hypervisor exchange process 300 is flow-charted in FIG. 3. At 301, virtual machines VM1-VMN are executing on an old hypervisor, which is executing on a machine. At 302, a virtual machine VM0 is installed with a "guest" hypervisor as its guest operating system. At 303, virtual machines VM1-VMN are migrated from the old hypervisor to the guest hypervisor, implementing consolidation 151 of FIG. 1. If the guest hypervisor is the same as the new hypervisor, the guest hypervisor can be used to validate that VM1-VMN and any partner software will run well together. Alternatively, the guest hypervisor may be the same as the old hypervisor or may be another hypervisor.

At 304, FIG. 3, the machine is partitioned to form partitions P1 and P2, with source partition P1 hosting VMs VM1-VMN. At 305, the new hypervisor is loaded onto target partition P2. Note that the consolidating 303 can occur before or after the partitioning at 304 and even after the installing at 305. At 306, FIG. 2, virtual machines VM1-VMN are migrated from the guest hypervisor to the new hypervisor, effecting exchange 152 of FIG. 1. The source partition P1 is destroyed at 307.

At 308, FIG. 3 virtual machines VM1-VMN are migrated from the guest hypervisor to the new hypervisor, effecting dissociation 153 of FIG. 1. At 309, FIG. 3, virtual machine VM0 can be terminated, completing the hypervisor exchange. The new hypervisor can be an upgraded version of the old version, so process 300 can be used as a same-machine hypervisor upgrade process.

In the case that the hypervisors are versions of VMware's ESX, process 300 uses a technique called loadESX to side-load the new hypervisor on a partition of the machine and to issue a fast migration from the source partition to the target partition. During this migration, if the virtual machines were rot consolidated, an error could leave the computer system in a state that from which there was no practical recovery. However, because of the consolidation, there is only one virtual machine being migrated; therefore, a failed migration can be resolved, by simply destroying the second partition which will revert the system to a known state.

One giant advantage of virtualization is that a virtual machine can run anywhere and the underneath hardware can change at any time without the virtual machine being aware of it. Thus, one can easily transform a system with N virtual machines to a system with only one virtual machine by simply creating a nested ESX VM and migrating all the other virtual machines onto it. Once the consolidation is complete, a new partition can be created with a fresh ESX. One can then migrate the nested ESX from the old partition to the new one. Lastly, the source partition can be destroyed, and all the nested ESX virtual machines can be migrated to the host ESX. Here is process 300 in algorithmic form, where the hypervisors are versions of ESX.

```
def upgradeESX( ):
  nESX=createNestedESX( )
  forall vm in host:
    migrate vm into nESX
  part=createPartition( )
  partESX=loadESX(part)
  migrate nESX into partESX
  destroyOldPartition( )
  forall vm in nESX:
    migrate vm into partESX
  destroy nESX
```

Note that "loadESX is simply referring to the process of launching another ESXi instance on a subset of the hardware.

Figure 4:
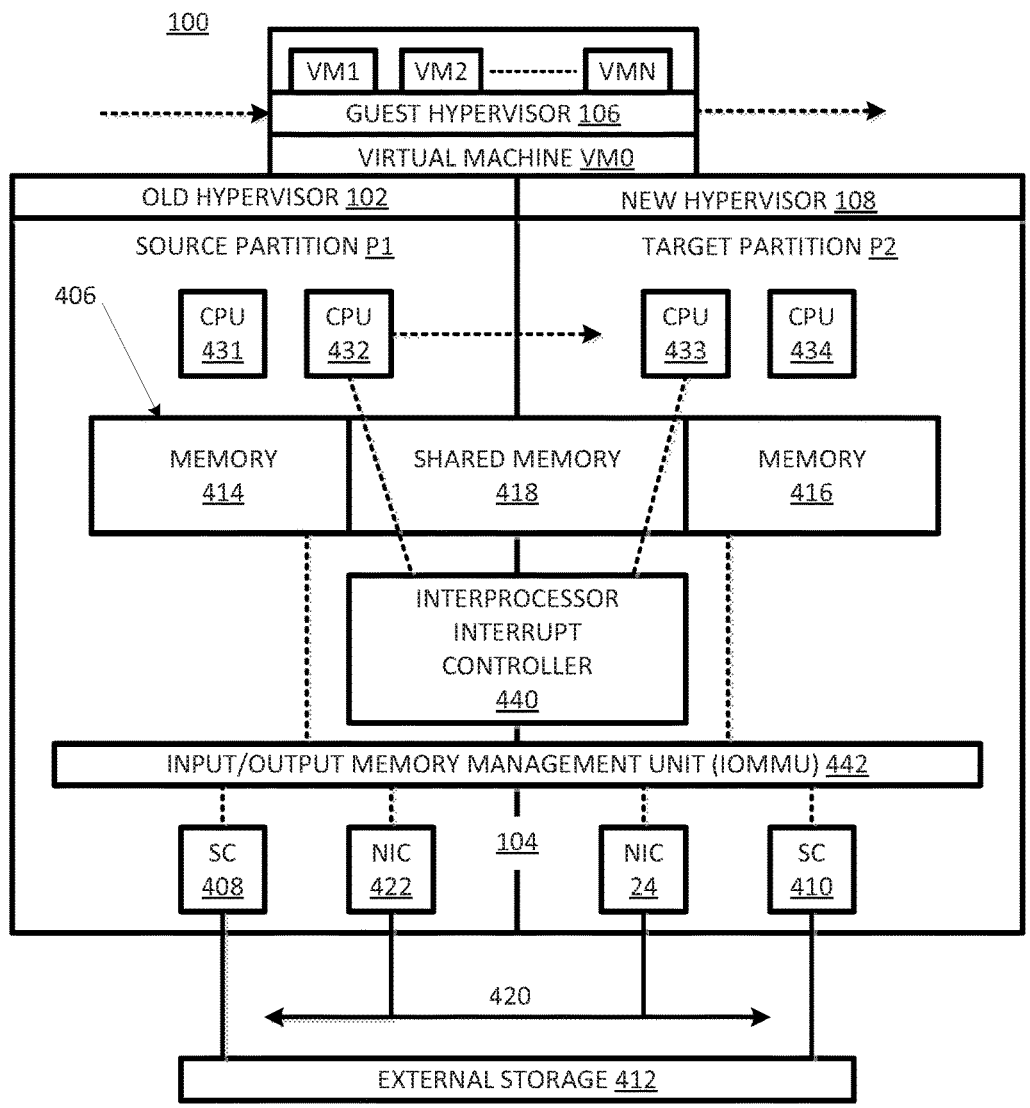
FIG. 4 is a schematic diagram of a computer system that can implement the processes of FIGS. 2 and 3.

Computer system 100 is shown in greater detail in FIG. 4. At the time represented in FIG. 4, machine 104 is divided to define source partition P1 and target partition P2. Old hypervisor 102 is running on source partition P1, while new hypervisor 108 is running on target partition P2. Virtual machines VM1-VMN are executing on guest hypervisor 106, which is hosted by virtual machine VM0. Virtual machine VM0 is being migrated from source partition P1 to target partition P2, as at action 306 of process 300, flow charted in FIG. 3.

Machine 102 includes memory 406, and storage controllers 408 and 410 for accessing external storage 412. Collectively, memory 406 and external storage 412 store substantially all the information defining virtual machines VM0 and VM1-VMN. Migrating the virtual machine is effected by transferring information from source partition P1 to target partition P2. The virtual machine images in memory and storage are not moved, rather pointers to memory and storage locations of the images are communicated by source partition P1 to target partition P2.

Memory 406 includes source-partition memory 414, target partition memory 416, and shared memory 418. Partition P1 informs target partition P2 of the locations within memory 414 that contain information needed to migrate a virtual machine. The target partition P2 then claims that memory so that, in effect, the claimed memory exits source-partition memory 414 and becomes part of target-partition memory 416, even though no memory physically moves with machine 102. Source partition P1 can prepare a list of memory pages and ranges freed as virtual machines are migrated from source partition P1. The list can be stored in shared memory 418, which can be accessed by both partitions. Target partition P2 can read the list and claim the listed memory. In an alternative embodiment, memory contents are physically moved from memory in source partition P1 to memory in target partition P2.

Machine 102 includes processors (CPUs) 431, 432, 433, and 434, which are divided among partitions P1 and P2 when the partitions are created. Eventually, however, all memory and devices (storage controllers, NICs, etc.) are to be transferred to the target partition P2. However, at least one processor, e.g., 431, and some memory 414 is required until very near the end to execute code of old hypervisor 104 to complete the transfer. The last processor 431 makes a final list of memory locations, stores it in shared memory 418, and shuts down. Target partition P2 reads the list and claims the memory and the last processor. Also, the target partition. P2 can reinitialize and claim shared memory. The source partition P1 is terminated and new hypervisor 108 takes control of all of machine 102. The resident virtual-machines are migrated to the new hypervisor, and the host VM is destroyed to complete the hypervisor upgrade/exchange process.

Some devices, such as an inter-processor interrupt controller (IPIC) 440 and an input/output memory management unit (IOMMU) 442 may be required by both partitions during VM migration. To avoid conflicts, access to these devices may be controlled, by respective semaphores i.e., locks). Whichever partition "owns" the semaphore, can use the device. The other partition is excluded until the previous owner releases the semaphore. Once the hypervisor update is complete, the semaphores can be dissolved. It should be noted that process 200 can be implemented on computer system 100 without the partitioning.

When the virtual machines are transferred to the nested ESXi virtual machine, its storage and networking settings remain the same. For networking, a virtual switch on the underlying ESXi host and the ESXi VM is configured to provide equivalent functionality. For the case of storage, the same storage is mounted into the virtual machine, assuming that the storage is remote like NFS or some other network share. If the storage is local, a small translation layer can be used so that the blocks in the virtual disks of the virtual machines VM1-VMN are the same before and after the migration.

In an alternate arrangement, there can be more than one nested. ESXi virtual machine. (i.e., there can be an m:n mapping of the number of virtual machines to the number of nested ESXi virtual machines created). There may be situations where moving all the virtual machines into one nested ESX virtual machine causes performance issues. In those cases, the resident virtual machines can be distributed among two or more such ESXi virtual machines. This will still drastically reduce the number of virtual machines that are to be dealt with when switching over from the old version to the new version of ESXi on the physical machine.

Herein, art labelled "prior art", if any, is admitted prior art; art not labelled "prior art" is not admitted prior art. The illustrated embodiments as well as variations thereupon and modifications thereto are provided for by the present invention, the scope of which is limited by the following claims.

What is claimed is:

1. A hypervisor-exchange process comprising:
   executing plural virtual machines on an old hypervisor that executes on a machine;
   consolidating the plural virtual machines by migrating them from the old hypervisor to a guest hypervisor running in a host virtual machine executing on the old hypervisor while the old hypervisor is executing on the machine;
   exchanging the old hypervisor for a new hypervisor so that the plural virtual machines are executing on the guest hypervisor, the guest hypervisor is executing on the host virtual machine, the host virtual machine is executing on the new hypervisor, and the new hypervisor is executing on the machine; and
   disassociating the plural virtual machines by migrating them, while the guest hypervisor is executing on the host virtual machine that is executing on the new hypervisor and the new hypervisor is executing on the machine, from the guest hypervisor to the new hypervisor.

2. The hypervisor-exchange process of claim 1 wherein the new hypervisor is an upgrade of the old hypervisor.

3. The hypervisor-exchange process of claim 1 further comprising:
   suspending, before the exchanging and by the old hypervisor, the host virtual machine; and
   resuming, after the exchanging and by the new hypervisor, the host virtual machine.

4. The hypervisor-exchange process of claim 1 further comprising:
   partitioning the machine to form source and target partitions, with the plural virtual machines executing on the source partition;
   installing the new hypervisor on the target partition; and
   migrating the host virtual machine from the source partition to the target partition.

5. The hypervisor-exchange process of claim 4 wherein the consolidating occurs before the partitioning.

6. The hypervisor-exchange process of claim 4 wherein the consolidating occurs after the partitioning.

7. The hypervisor-exchange process of claim 1 wherein:
   the executing includes executing additional virtual machines on the old hypervisor;
   the consolidating includes migrating the additional virtual machines to additional guest hypervisors running on additional host virtual machines running on the old hypervisor; and
   the disassociating includes migrating the additional virtual machines from the additional guest hypervisors to the new hypervisor.

8. A hypervisor-exchange system comprising non-transitory media encoded with code that, when executed by a processor, implements a process including:
   executing plural virtual machines on an old hypervisor that executes on a machine;
   consolidating the plural virtual machines by migrating them from the old hypervisor to a guest hypervisor running in a host virtual machine executing on the old hypervisor while the old hypervisor is executing on the machine;
   exchanging the old hypervisor for a new hypervisor so that the plural virtual machines are executing on the guest hypervisor, the guest hypervisor is executing on the host virtual machine, the host virtual machine is executing on the new hypervisor, and the new hypervisor is executing on the machine; and
   disassociating the plural virtual machines by migrating them, while the guest hypervisor is executing on the host virtual machine that is executing on the new hypervisor and the new hypervisor is executing on the machine, from the guest hypervisor to the new hypervisor.

9. The hypervisor-exchange system of claim 8 wherein the new hypervisor is an upgrade of the old hypervisor.

10. The hypervisor-exchange system of claim 8 wherein the process further includes:
    suspending, before the exchanging and by the old hypervisor, the host virtual machine; and
    resuming, after the exchanging and by the new hypervisor, the host virtual machine.

11. The hypervisor-exchange system of claim 8 wherein the process further includes:
    partitioning the machine to form source and target partitions, with the plural virtual machines executing on the source partition;
    installing the new hypervisor on the target partition; and
    migrating the host virtual machine from the source partition to the target partition.

12. The hypervisor-exchange system of claim 11 wherein the consolidating occurs before the partitioning.

13. The hypervisor-exchange system of claim 11 wherein the consolidating occurs after the partitioning.

14. The hypervisor-exchange system of claim 8 wherein:
    the executing includes executing additional virtual machines on the old hypervisor;
    the consolidating includes migrating the additional virtual machines to additional guest hypervisors running on additional host virtual machines; and
    the disassociating includes migrating the additional virtual machines from the additional guest hypervisors to the new hypervisor.

15. The hypervisor-exchange system of claim 8 further comprising the processor.

* * * * *